United States Patent
Lee et al.

(10) Patent No.: US 11,030,976 B2
(45) Date of Patent: Jun. 8, 2021

(54) IMAGE COMBINATION DEVICE AND DISPLAY SYSTEM COMPRISING THE SAME

(71) Applicant: Samsung Electronics Co., Ltd., Suwon-si (KR)

(72) Inventors: Dong-Han Lee, Seongnam-si (KR); Min-Soo Kim, Hwaseong-si (KR); Jong-ho Roh, Yongin-si (KR); Sung-Hoo Choi, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/655,965

(22) Filed: Oct. 17, 2019

(65) Prior Publication Data

US 2020/0051532 A1 Feb. 13, 2020

Related U.S. Application Data

(63) Continuation of application No. 14/986,820, filed on Jan. 4, 2016, now Pat. No. 10,490,168.

(30) Foreign Application Priority Data

Feb. 3, 2015 (KR) .......................... 10-2015-0016624

(51) Int. Cl.
G09G 5/377 (2006.01)
G06T 1/20 (2006.01)
G09G 5/36 (2006.01)

(52) U.S. Cl.
CPC .............. *G09G 5/377* (2013.01); *G06T 1/20* (2013.01); *G09G 5/36* (2013.01); *G09G 2340/12* (2013.01);

(Continued)

(58) Field of Classification Search
CPC ...... G09G 5/377; G09G 5/36; G09G 2370/20; G09G 2340/12; G09G 2350/00; G06T 1/20; G06T 3/40; G06F 3/1415; G06F 3/147

(Continued)

(56) References Cited

U.S. PATENT DOCUMENTS 7,088,375 B1  8/2006  Hamburg
7,502,022 B2  3/2009  Ageishi et al.

(Continued)

FOREIGN PATENT DOCUMENTS

CN  101655991 A  2/2010
JP  H10210364 A  8/1998

(Continued)

OTHER PUBLICATIONS

Taiwanese Office Action dated Mar. 4, 2020 for corresponding Taiwanese Application No. 105103409.

*Primary Examiner* — Jennifer Mehmood
*Assistant Examiner* — Kim Thanh Tran
(74) *Attorney, Agent, or Firm* — Harness, Dickey & Pierce, P.L.C.

(57) ABSTRACT

Providing an image combination device and/or a display system comprising the same. The image combination device including an SGL control unit separating a plurality of layers into a first group layer and a second group layer not overlapping the first group layer, and a multi-layer blender combining the first group layer to produce a first composite image in a first frame and combining the second group layer including updated layers with the first composite image of the first frame to produce a second composite image in a second frame subsequent to the first frame.

20 Claims, 15 Drawing Sheets

(52) U.S. Cl.
CPC ..... *G09G 2350/00* (2013.01); *G09G 2370/20* (2013.01)

(58) Field of Classification Search
USPC .......................................................... 345/634
See application file for complete search history.

(56) References Cited

U.S. PATENT DOCUMENTS

| | | |
|---|---|---|
| 8,274,501 B2 | 9/2012 | Kwa et al. |
| 2004/0218827 A1 | 11/2004 | Cohen et al. |
| 2005/0213853 A1* | 9/2005 | Maier .................... G06T 15/503 |
| | | 382/302 |
| 2005/0253868 A1* | 11/2005 | Ageishi .................... G09G 5/14 |
| | | 345/629 |
| 2007/0217002 A1* | 9/2007 | Fukue ................. G09G 5/393 |
| | | 359/443 |
| 2007/0222798 A1* | 9/2007 | Kuno ................. H04N 21/4316 |
| | | 345/634 |
| 2008/0024390 A1 | 1/2008 | Baker et al. |
| 2009/0305782 A1 | 12/2009 | Oberg et al. |
| 2010/0039447 A1* | 2/2010 | Nakao .................... H04N 1/387 |
| | | 345/634 |
| 2010/0045691 A1 | 2/2010 | Naito et al. |
| 2011/0093099 A1 | 4/2011 | Tran et al. |
| 2012/0162243 A1 | 6/2012 | Matsuo et al. |
| 2012/0163732 A1 | 6/2012 | Hoshino et al. |
| 2013/0120424 A1 | 5/2013 | Nance et al. |
| 2015/0169604 A1* | 6/2015 | Oh .......................... G06F 21/57 |
| | | 707/823 |

FOREIGN PATENT DOCUMENTS

| | | |
|---|---|---|
| JP | 2002229554 A | 8/2002 |
| JP | 2007214659 A | 8/2007 |
| JP | 2011232467 A | 11/2011 |
| KR | 10-0776433 B1 | 11/2007 |
| TW | 200822070 A | 5/2008 |

* cited by examiner

1200

1300

1400

IMAGE COMBINATION DEVICE AND DISPLAY SYSTEM COMPRISING THE SAME

CROSS-REFERENCE TO RELATED APPLICATIONS

This U.S. non-provisional application is a continuation of U.S. application Ser. No. 14/986,820, filed on Jan. 4, 2016, which claims priority from Korean Patent Application No. 10-2015-0016624 filed on Feb. 3, 2015 in the Korean Intellectual Property Office, and all the benefits accruing therefrom under 35 U.S.C. § 119, the disclosure of each of which is incorporated herein in its entirety by reference.

BACKGROUND

1. Field

Example embodiments of the present inventive concepts relate to image combination devices and/or display systems comprising the same.

2. Description of the Related Art

Conventional display systems used in mobile equipment include a multi-layer blender producing a final output by combining a plurality of layers. Each of the layers is sequentially combined in a certain priority order, and a final result is produced. The multi-layer blender must operate for each frame in order to produce frame data for output. For this purpose, the display system must read a plurality of layers from memory for each frame, thus increasing the power consumption of the mobile equipment, and also requires that the mobile equipment and display system have a large memory bandwidth.

In addition, as the resolution of display and the number of layers to be combined is gradually increased, the required bandwidth and power tend to be gradually increased. In order to overcome this problem, a method of retransmitting previously-combined results or allowing a DDI (Display Driver IC) to reuse existing results if no change occur in all layers has been used. However, this method is also problematic in that data of all layers must be read from memory again and then combined even when only one layer is changed.

SUMMARY

Aspects of the present inventive concepts provide an image combination device in which, based on updated attribute information about layers, only updated layers are read from memory, and previously combined data are used in non-updated layers, thereby reducing (and/or minimizing) the number of memory accesses performed and also reducing (and/or minimizing) the number of layers that need to be combined.

Aspects of the present inventive concepts provide a display system in which, based on updated attribute information about layers, only updated layers are read from memory, and previously combined data is used in non-updated layers, thereby reducing (and/or minimizing) the number of memory accesses performed and also reducing (and/or minimizing) the number of layers that need to be combined.

However, aspects of the present inventive concepts are not restricted to the one set forth herein. The above and other aspects of the present inventive concepts will become more apparent to one of ordinary skill in the art to which the present inventive concept pertains by referencing the detailed description of the present inventive concept given below.

According to an aspect of the present inventive concepts, there is provided an image combination device that may include a sparse group layer (SGL) control unit configured to separate a plurality of layers into a first layer group and a second layer group, the layers of the second layer group not including the layers of the first layer group, and a multi-layer blender configured to combine the first layer group to produce a first composite image in a first frame and combine the second layer group including updated layers with the first composite image of the first frame to produce a second composite image in a second frame subsequent to the first frame.

According to various example embodiments, the image combination device may include a memory configured to store the first composite image, a SGL output unit configured to receive the first composite image and transmit the received first composite image to the memory, and a composite output unit configured to receive the second composite image and transmit the received second composite image to an external device.

According to various example embodiments, the image combination device may include the SGL output unit is configured to transmit the first composite image to the memory when the layers included in the SGL are updated, and the SGL output unit is configured to not transmit the first composite image to the memory when the layers included in the SGL are not updated.

According to various example embodiments, the image combination device may include the composite output unit is configured to transmit the second composite image to the external device for each frame.

According to various example embodiments, the image combination device may include the SGL control unit is electrically connected to the SGL output unit or the composite output unit to control an operation of the SGL output unit or the composite output unit.

According to various example embodiments, the image combination device may include the memory is located in the multi-layer blender, or is located outside the multi-layer blender as a separate memory.

According to various example embodiments, the image combination device may include the SGL control unit comprises a sparse attribute register (SAR) configured to store update attribute information about each of the layers input to the multi-layer blender, the update attribute information includes a first attribute or a second attribute, and the first attribute or the second attribute is given based on data previously determined in each of the layers, or is given based on information stored in an update counter register (UCNT) configured to store update frequency information about each of the layers.

According to various example embodiments, the image combination device may include the first group layer includes a set of successive layers having the first attribute.

According to various example embodiments, the image combination device may include the SGL control unit includes an update register (UPD) configured to store update information about each of the layers input to the multi-layer blender, and the UPD includes information about whether each of the layers is updated with respect to a current frame.

According to various example embodiments, the image combination device may include the multi-layer blender is configured to not produce the first composite image in the second frame when the layers included in the first group layer are not updated, and the multi-layer blender is configured to produce the second composite image using the first composite image produced in the first frame and the updated layers.

According to various example embodiments, the image combination device may include the SGL control unit further includes a valid layer register (VLD) configured to store information about whether each of the layers input to the multi-layer blender is valid, and a sparse group layer register (SGLR) configured to store information about whether each of the layers input to the multi-layer blender is included in the first group layer.

According to various example embodiments, the image combination device may include the multi-layer blender is configured to perform a combination operation of the layers in which the VLD is activated.

According to various example embodiments, the image combination device may include the first composite image is obtained by combining at least two of the plurality of layers input to the multi-layer blender, and the second composite image is obtained by combining all of the plurality of layers input to the multi-layer blender.

According to various example embodiments, the image combination device may include a layer input unit configured to transmit the plurality of layers to the multi-layer blender and controlled by the SGL control unit, and the layer input unit is further configured to read each of the layers from an external memory, or receive each of the layers from an external module, and transmit the read or received layers to the multi-layer blender.

According to various example embodiments, the image combination device may include the layer input unit is configured to receive the first composite image, or receive each of the layers included in the SGL, and transmit the received first composite image or layers included in the SGL to the multi-layer blender.

According to various example embodiments, the image combination device may include the layer input unit includes N access units configured to receive at least one of the plurality of layers, the SGL control unit is configured to assign addresses of each of the layers to be received by the layer receiving unit to each of the access units, and each of the N access units is configured to receive the at least one of the plurality of layers from the memory, the external memory or the external module.

According to an aspect of the present inventive concepts, there is provided an image combination device including a layer receiving unit configured to receive a plurality of layers corresponding to a current frame, a sparse group layer (SGL) control unit configured to separate the plurality of layers into a first layer group, and a second layer group, the layers in the second layer group not overlapping the layers in the first layer group, the SGL control unit including a sparse attribute register (SAR) configured to store update attribute information about the plurality of layers that are activated, a memory configured to store the first composite image of a frame prior to the current frame, and a multi-layer blender configured to combine the first composite image transmitted from the memory with the second layer group to produce a second composite image.

According to various example embodiments, the image combination device may include an SGL output unit configured to receive the first composite image and transmit the received first composite image to the memory, and a composite output unit configured to receive the second composite image and transmit the second composite image to an external device.

According to various example embodiments, the image combination device may include the SGL output unit is configured to transmit the first composite image to the memory when the layers included in the SGL are updated, and the SGL out unit is configured to not transmit the first composite image to the memory when the layers included in the SGL are not updated.

According to various example embodiments, the image combination device may include the composite output unit is configured to transmit the second composite image to the external device for each frame.

According to various example embodiments, the image combination device may include a layer input unit configured to transmit the plurality of layers to the multi-layer blender and the layer input unit is controlled by the SGL control unit, and the layer input unit is configured to read each of the layers from an external memory or an external module, or read the first composite image stored in the memory.

According to various example embodiments, the image combination device may include the SGL control unit further includes an update counter register (UCNT) configured to store update frequency information about the plurality of layers, and an update register (UPD) configured to store update information about the plurality of layers.

According to various example embodiments, the image combination device may include the SGL control unit further includes a valid layer register (VLD) configured to store information about whether the plurality of layers are valid, and a sparse group layer register (SGLR) configured to store information about whether the plurality of layers are included in the sparse group layer (SGL).

According to various example embodiments, the image combination device may include the multi-layer blender is configured to perform a combination operation of the layers in which the VLD is activated, and the multi-layer blender is configured to produce the first composite image of the layers in which both of the VLD and the SGLR are activated.

According to an aspect of the present inventive concepts, there is provided a display system including a processor configured to combine some layers of a plurality of layers to produce a first composite image and combine other layers of the plurality of layers to produce a second composite image; a memory storing the first composite image, and the processor includes a multi-layer blender configured to receive the plurality of layers and output the first and second composite images; a sparse group layer (SGL) output unit configured to transmit the first composite image to the memory; a composite output unit configured to transmit the second composite image; and a SGL control unit configured to control the multi-layer blender, the SGL output unit and the composite output unit, wherein the processor is configured to produce the first composite image when any one of layers included in a first group layer is set by the SGL control unit in a first frame, and is stored in the memory, and the processor is configured to produce the second composite image by using the first composite image stored in the memory when all of layers included in the first group layer are not updated in a second frame after the first frame.

According to various example embodiments, the display system may include a layer input unit configured to transmit the plurality of layers to the multi-layer blender and controlled by the SGL control unit, and read each of the layers from external memory or an external module, or read the first composite image stored in the memory.

According to various example embodiments, the display system may include the SGL control unit further includes an update counter register (UCNT) configured to store update frequency information about the plurality of layers, a sparse attribute register (SAR) configured to store update attribute information about the plurality of layers, and an update register (UPD) configured to store update information about the plurality of layers.

According to various example embodiments, the display system may include the first group layer includes successive layers in the layers in which the SAR is activated.

According to various example embodiments, the display system may include the update attribute information include a first attribute or a second attribute, and the first attribute or the second attribute is given based on data previously determined in each of the layers, or is given based on the UCNT storing update frequency information about each of the layers.

According to various example embodiments, the display system may include the SGL control unit further includes a valid layer register (VLD) configured to store information about whether each of the layers input to the multi-layer blender is valid, and a sparse group layer register (SGLR) configured to store information about whether each of the layers input to the multi-layer blender is included in the sparse group layer (SGL).

According to various example embodiments, the display system may include the multi-layer blender is configured to perform a combination operation using the layer in which the VLD is activated, and the multi-layer blender is configured to produce the first composite image of the layer in which the VLD and the SGLR are activated.

According to various example embodiments, the display system may include the multi-layer blender is configured to produce the first composite image when the layers included in the first group layer are updated, and the multi-layer blender is configured to not produce the first composite image when the layers included in the first group layer are not updated.

According to various example embodiments, the display system may include the multi-layer blender is configured to produce the second composite image for each frame.

According to an aspect of the present inventive concepts, there is provided a display system including a memory configured to store image data, the image data including a plurality of layers, a controller configured to assign attribute information to each of the plurality of layers of the image data based on update characteristics of each of the plurality of layers and to assign each of the plurality of layers into one of at least two groups based on the assigned attribute information of each of the plurality of layers, a multi-layer blender configured to receive the plurality of layers from the memory, process the plurality of layers based on the assigned group, and produce a final composite image based on the results of the processed plurality of layers, and a display panel configured to display the final composite image.

According to various example embodiments, the display system may include the assigned attribute information includes a first attribute indicating that the layer is not updated or a second attribute indicating that the layer is updated, and the controller is configured to assign each of the plurality of layers into a first group or a second group based on whether each of the plurality of layers has the first attribute or the second attribute.

According to various example embodiments, the display system may include the multi-layer blender is further configured to process the plurality of layers based on the assigned group, the processing including combining the layers assigned to the first group to form an intermediate composite image and storing the intermediate composite image in the memory, and combining the intermediate composite image with the layers assigned to the second group to form the final composite image.

According to various example embodiments, the display system may include a first register configured to store update frequency information for each of the layers of the plurality of layers, and a second register configured to store update information for each of the layers of the plurality of layers.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION

Figure 1:
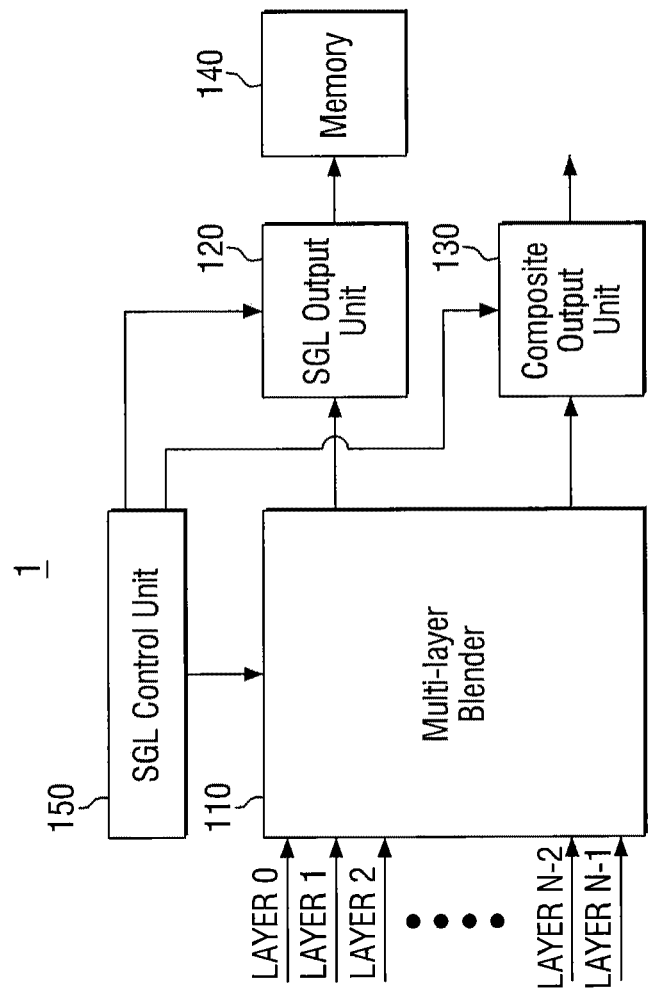
FIG. 1 is a block diagram illustrating an image combination device according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, an image combination device and a display system including the same will be described with reference to FIGS. 1 to 15.

FIG. 1 is a block diagram illustrating an image combination device according to at least one example embodiment of the present inventive concepts.

Referring to FIG. 1, the image combination device 1 includes a multi-layer blender 110, an SGL control unit 150 (e.g., a SGL controller), an SGL output unit 120, and a composite output unit 130. The image combination device 1 may further include memory 140.

The multi-layer blender 110 can form one layer by overlapping a plurality of image layer information and/or data (hereinafter referred to as "layers"). That is, the multi-layer blender 110 can form one composite layer by combining a plurality of layers.

Specifically, the multi-layer blender 110 can produce a final composite image by receiving image data to be subjected to image combination from the memory 140, or an external module, and combining this image data according to the desired (and/or alternatively predetermined) operation. In this case, each individual image to be subjected to image combination corresponds to one layer, but is not limited thereto. The multi-layer blender 110 can combine a plurality of input layers into one image by overlapping these input layers with each other.

Data about the plurality of layers can be transmitted and received from external memory (not shown) or an external device (not shown). Specifically, the multi-layer blender 110 can read necessary data in a layer unit using an address value for external memory (not shown) or an external device (not shown).

Since the plurality of layers each exist independently, the updating periods for each of the layers may be different from each other. Images of some layers (for example, videos, etc.) may be frequently updated, and images of other layers (for example, background images, etc.) may be infrequently updated, if at all.

In the related art, even when only one of the plurality of layers is changed and the other layers are maintained, images were combined by reading all of the plurality of layers again. However, in most situations a substantial number of the layers are rarely changed, or are infrequently changed, and only some of the layers are changed. Using the related art, the rarely-changed layers must also be combined by reading data from memory every time depending on the frequency of the frequently-changed layers. That is, in the related art, since data about non-updated layers must be read over a plurality of times, there is a problem of resources being wasted.

The image combination device 1 may provide a first attribute (e.g., sparse) to a layer that is frequently updated, and may provide a second attribute (e.g., non-sparse) to a layer that is less frequently updated.

The multi-layer blender 110 may produce a final composite image for each frame. Further, the multi-layer blender may set a group layer (for example, a sparse group layer (SGL)) of the layers having the first attribute, and may produce an intermediate composite image and store this intermediate composite image in the memory 140. Hereinafter, the intermediate composite image is referred to as a first composite image (e.g., the SGL composite image of FIG. 5), and the final composite image of each frame is referred to as a second composite image (e.g., the final composite image of FIG. 5). The example embodiments of the present inventive concepts will be described based on these terms.

The multi-layer blender 110 may combine some of the plurality of layers, i.e., a desired quantity of the plurality of the layers, to produce the first composite image, and may combine the first composite image and the other layers, i.e., remaining layers of the plurality of layers, to produce the second composite image.

In this case, the first composite image may be produced when any one of the layers included in the group layer set by the SGL control unit 150 in the first frame is updated. The produced first composite image may be stored in the memory 140 through the SGL output unit 120. Further, the first composite image may not be produced for each frame.

The second composite image can be produced using the first composite image stored in the memory 140 when all of the layers included in the group layer set by the SGL control unit 150 are not updated in the second frame after the first frame. Specifically, the second composite image can be produced based on the first composite image stored in the first frame and the layers not included in the group layer set by the SGL control unit 150. The produced second composite image can be transmitted to an external device (not shown) through the composite output unit 130 for each frame.

The SGL control unit 150 may control a sparse group layer (hereinafter, referred to as "SGL"). The SGL refers to a maximum set of successive layers in the plurality of layers having a first attribute (e.g., sparse) based on the composite priority order. The SGL control unit 250 can give and/or assign a first attribute (e.g., sparse) or a second attribute (e.g., non-sparse) to the plurality of layers. In addition, the SGL control unit 250 can divide the plurality of layers into a first layer group having a first attribute (e.g., sparse) and belonging to the SGL and a second layer group not overlapping the first layer group (i.e., the layers of the first layer group do not include layers included in the second layer group). A detailed description thereof will be described later with reference to FIGS. 2 and 3.

In this case, the multi-layer blender 110 combines the first layer group to produce a first composite image in the first frame, and combines the second layer group including updated layers, or in other words the layers of the plurality of layers that have been updated and/or modified, with the first composite image produced in the first frame to produce a second composite image in a second frame subsequent to the first frame.

The SGL output unit 120 may transmit the composite images of the layers included in the SGL to the memory or a buffer (not shown). The SGL output unit 120 may receive the first composite image combined by the multi-layer blender 110 and transmit this first composite image to the memory 140. The SGL output unit 120 may be controlled by the SGL control unit. In addition, the SGL output unit 120 may transmit the first composite image to the memory 140 when the layers included in the SGL are updated, and may not transmit the first composite image to the memory 140 when the layers included in the SGL are not updated.

The composite output unit 130 may receive an image finally combined by the multi-layer blender 110 (e.g., the second composite image) and transmit this second composite image to the external device (not shown) for each frame. For example, the external device (not shown) may include a display panel, monitor, projector, television, etc., displaying the second composite image. However, the example embodiments are not limited thereto.

The memory 140 may store the first composite image, and may transmit data about the first composite image. In addition, the memory 140 may function as operation memory necessary to operate the image combination device 1. The memory 140 may be located in the multi-layer blender, or may also be located outside the multi-layer blender as separate memory.

In some example embodiments of the present inventive concepts, the memory 140 may be disposed outside the multi-layer blender 110 as shown in FIG. 1. For example, the memory 140 can be packaged with the multi-layer blender 110 in the form of a PoP (Package on Package), a SoC (System on Chip), etc. The memory 140, for example, may be a non-volatile memory device such as a semiconductor disk device (SSD), a hard disk device, a tape drive, a rewriteable optical disk, etc. However, the example embodiments of the present inventive concepts are not limited thereto.

Figure 2:
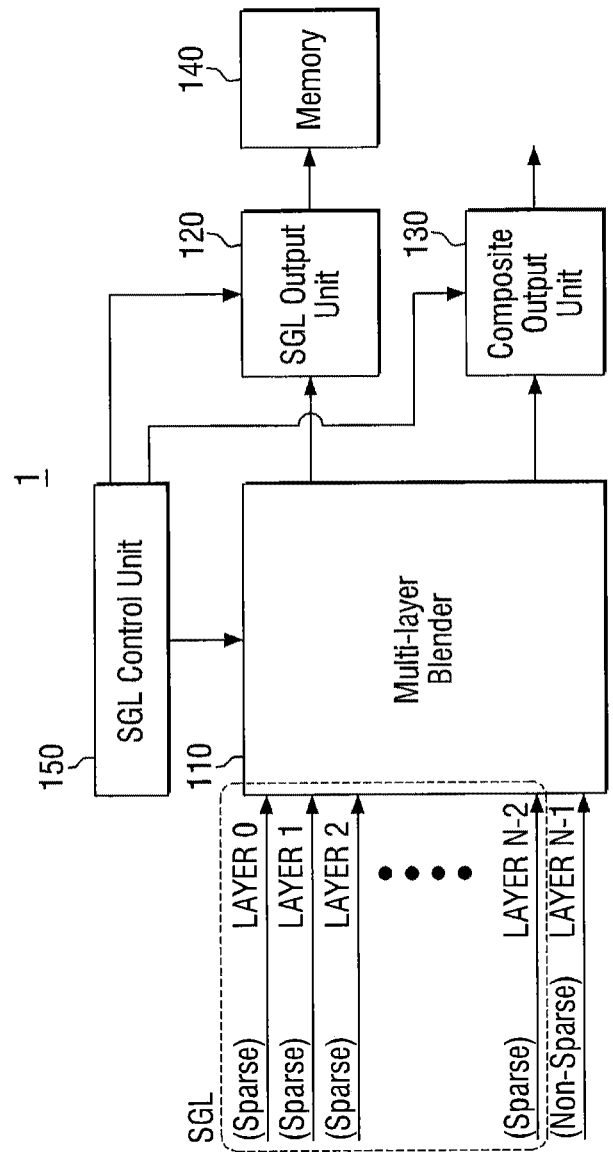
FIGS. 2 to 4 are block diagrams illustrating the SGL of the image combination device according to at least one example embodiment.
Figure 3:
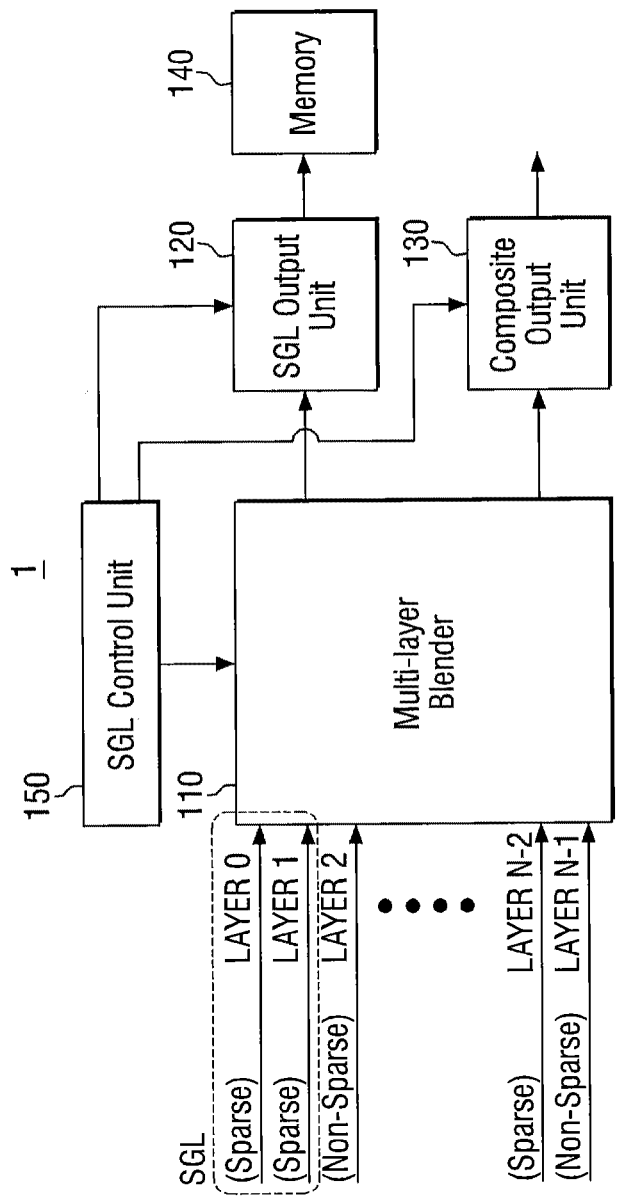
Figure 4:
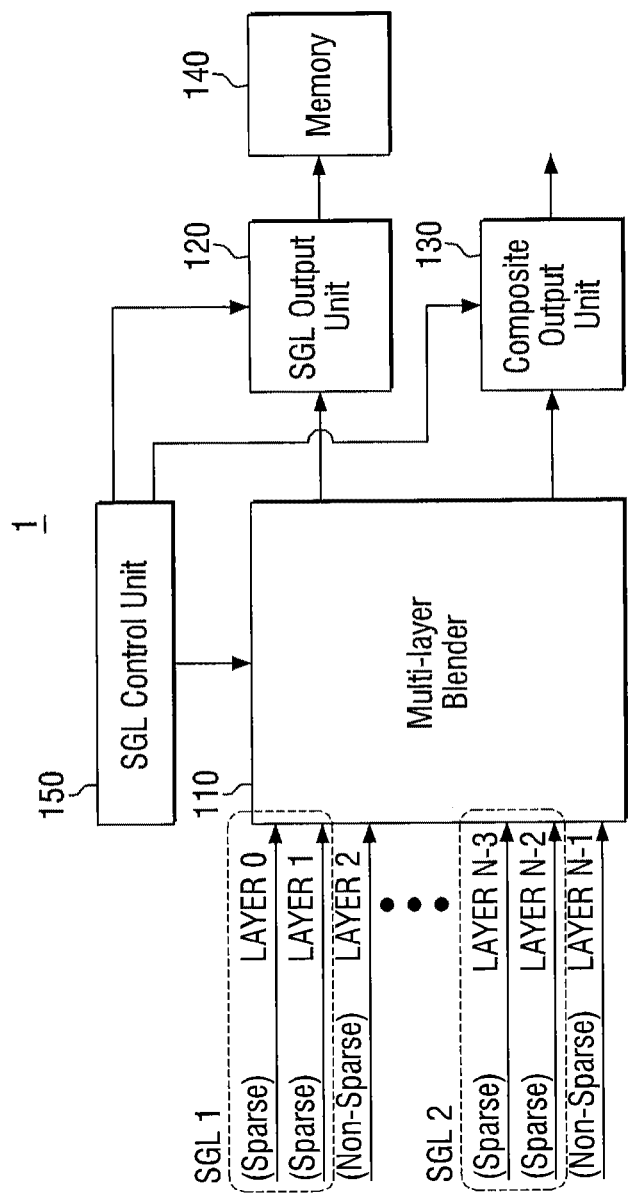

FIGS. 2 to 4 are block diagrams illustrating the SGL of the image combination device according to at least one example embodiment.

The SGL control unit 150 may give a first attribute (e.g., sparse) to frequently updated layers in the plurality of layers input to the multi-layer blender 110, and may give a second attribute (e.g., non-sparse) to layers that are not frequently updated. Although described in detail later, the first attribute (e.g., sparse) and/or the second attribute (e.g., non-sparse) may be given by users based on the data desired (and/or alternatively predetermined) in each of the layers. However, the example embodiments of the present inventive concepts are not limited thereto, and the first attribute (e.g., sparse)

and/or the second attribute (e.g., non-sparse) may also be given based on update frequency information about each of the layers.

The SGL may include a desired (and/or maximum) set of successive layers having the first attribute (e.g., sparse). The plurality of layers input to the multi-layer blender 110 may be combined by a desired (and/or alternatively predetermined) sequence of operations. For example, the multi-layer blender 110 may perform a combination operation where a layer 0 and a layer 1 are combined, and then the combined layer is additionally combined with a layer 2. That is, the multi-layer blender 110 can sequentially combine the plurality of layers in a desired (and/or alternatively predetermined) order. The combination order of layers may be determined depending on the structure or design method of a display system. Therefore, the SGL may be and/or must be composed of a set of successive layers in the layers aligned by the combination order of the multi-layer blender 110.

In FIG. 2, among the plurality of layers input to the multi-layer blender 110, N−1 layers from layer 0 to layer N−2 are sparse layers having a first attribute (e.g., sparse) according to at least one example embodiment. In this case, the SGL is a desired (and/or maximum) set of successive layers from layer 0 to layer N−2. That is, the SGL includes N−1 layers.

In FIG. 3, the number of the layers input to the multi-layer blender 110 is N, and layers having a second attribute are disposed at the middle thereof according to at least one example embodiment. In FIG. 3, the successive layers having a first attribute include layer 0 and layer 1. However, since the combination order of layer N−2 is not continuous, only layer 0 and layer 1 are included in the SGL. That is, in FIG. 3, the SGL is composed of two layers of layer 0 and layer 1. According to some example embodiments, the SGL control unit 150 can set only one SGL. However, the example embodiments of the present inventive concepts are not limited thereto, and some example embodiments may include a SGL control unit 150 that may set more than one SGL.

In FIG. 4, the SGL control unit 150 can set a plurality of SGLs (for example, SGL1 and SGL2, etc.) according to at least one example embodiment. In FIG. 4, the successive layers having a first attribute (e.g., sparse) include layer 0, layer 1, layer N−3, and layer N−2. In this case, the first SGL (e.g., SGL 1) includes layer 0 and layer 1, and the second SGL (e.g., SGL 2) includes layer N−3 and layer N−2.

Figure 5:
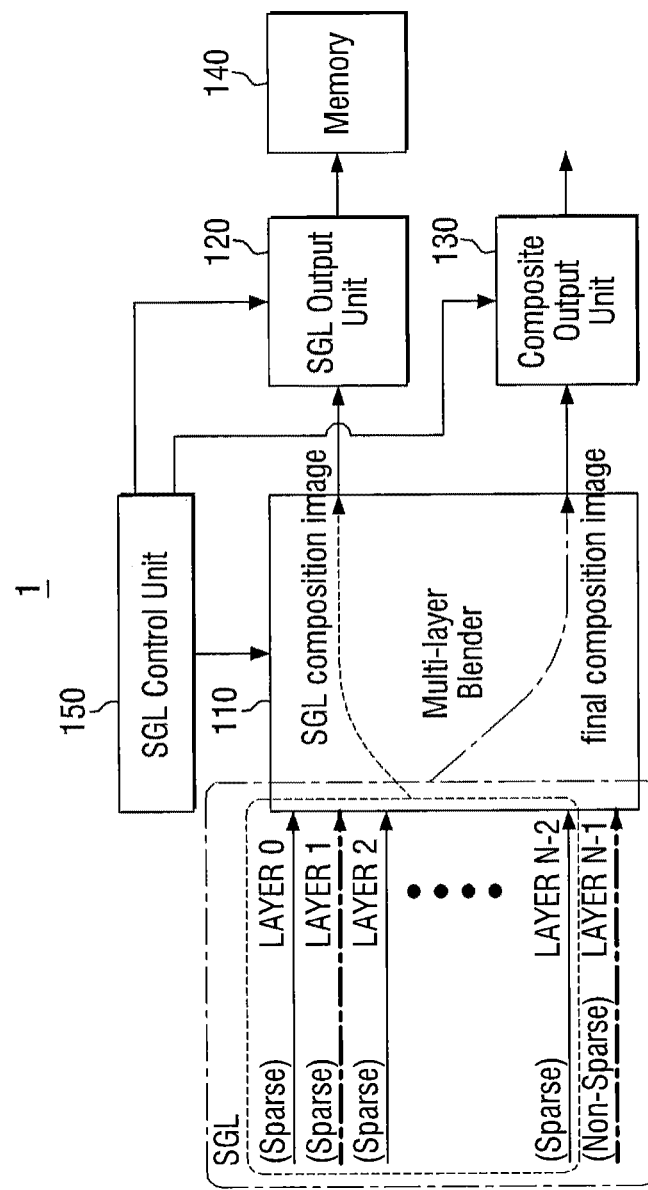
FIGS. 5 and 6 are block diagrams illustrating the operations of the image combination device according to at least one example embodiment.
Figure 6:
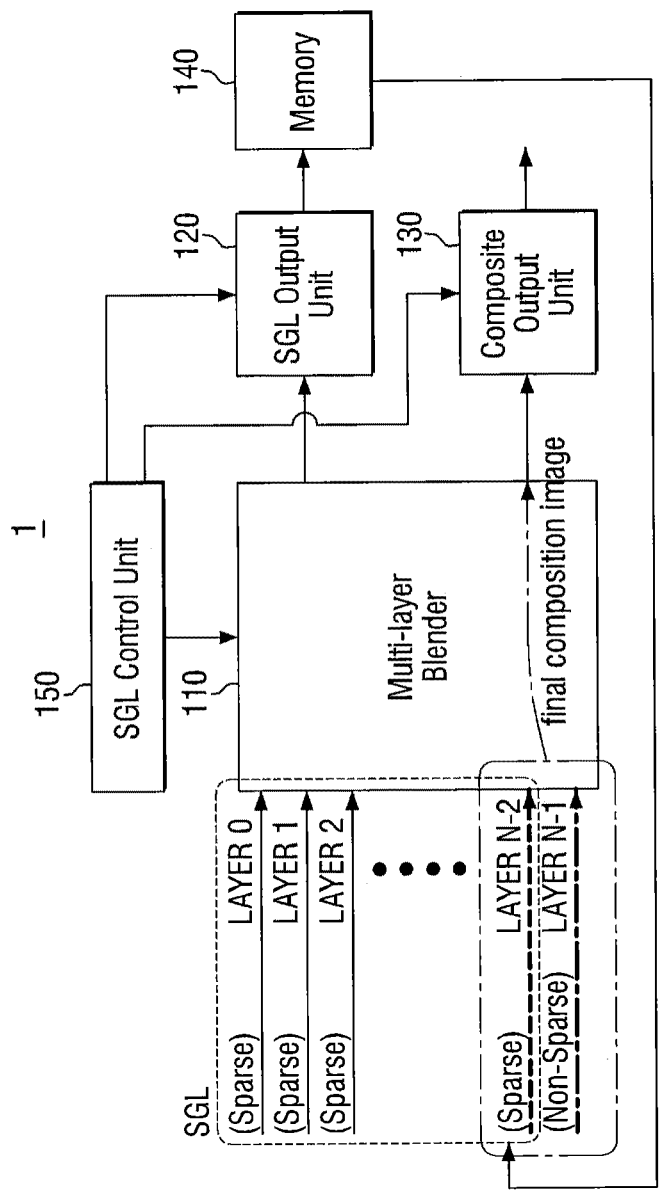

FIGS. 5 and 6 are block diagrams illustrating the operations of the image combination device according to at least one example embodiment.

The multi-layer blender 110 can produce a first composite image of all of the layers included in the SGL even when one or more of the layers included in the SGL is updated. In this case, the multi-layer blender 110 can also produce a second composite image of the plurality of layers together with the first composite image. In contrast, even when one or more of the layers included in the SGL is not updated, the multi-layer blender 110 can produce the second composite image using the previously produced first composite image without producing a new first composite image. Thus, the image combination device 1 can reduce the consumption of resource and power used in reading data from external memory (not shown) by the size of the SGL for each frame that does not combine the first composite image.

Referring to FIG. 5, FIG. 5 shows an initial image combination procedure or an image combination procedure when updated layers exist in the layers included in the SGL according to at least one example embodiment. In this case, the multi-layer blender 110 reads all of the plurality of layers and performs a combination work for all these layers. At this time, the multi-layer blender 110 can produce a first composite image of the layers included in the SGL and store this first composite image in external memory (not shown) or a buffer. This stored first composite image can be reused when the layers included in the SGL are not changed. In addition, the multi-layer blender 110 can produce a second composite image of all of the layers and output this second composite image to an external device (not shown) through the composite output unit 130.

Referring to FIG. 6, FIG. 6 shows an image combination procedure when updated layers do not exist in the layers included in the SGL according to at least one example embodiment. In this case, since the layers included in the SGL are not updated, an intermediate composite image of these layers exists in the memory 140, or a buffer. In this case, the multi-layer blender 110 combines the previously stored first composite image with only the layers not included in the SGL to produce a final composite image, that is, a second composite image. The produced second image combination may be transmitted to an external device (not shown) through the composite output unit 130. In this case, the multi-layer blender 110 may output the first composite image through the SGL output unit 120 without reading the layers corresponding to the SGL.

Further, in FIG. 6, when the multi-layer blender 110 reads the first composite image stored in the memory 140, or the buffer, any one channel of SGL reading channels may be used. For example, the multi-layer blender 110 may read the first composite image stored in the memory 140 instead of reading layer N−2. For example, the SGL control unit 150 can read the first composite image by assigning the address of the first composite image stored in the memory 140 to the multi-layer blender 110 instead of the read address of layer N−2. However, the example embodiments of the present inventive concepts are not limited thereto, and the multi-layer blender 110 may read the first composite image in place of any other layer of the SGL.

Thus, the image combination device 1 of at least one example embodiment of the present inventive concepts can reduce (and/or minimize) the image input and combination operation of non-updated layers, thereby decreasing the required memory bandwidth and reducing the consumption of power.

Consequently, as shown in FIG. 5, when updated layers exist in the SGL, the image combination device 1 of at least one example embodiment of the present inventive concepts, similar to the conventional blender, reads all layers and performs a combination work for all the layers. In addition, the image combination device 1 records the composite image of only the SGL (that is, first composite image) in the memory 140 or the buffer. In this case, the image combination device 1 may require additional memory bandwidth and power consumption.

However, as shown in FIG. 6, when updated layers do not exist in the SGL, the image combination device 1 reads the previously stored composite image of the SGL (that is, the first composite image) without reading the image of the layers included in the SGL, and performs a combination work for the residual layers that are not included in the SGL, thereby reducing memory bandwidth requirements and power consumption.

Consequently, in a general display system, the frequency of operations of FIG. 6 exhibiting saving effects is remarkably high compared to the frequency of operations of FIG. 5 consuming additional resourced, and thus the image combination device of at least one example embodiment of the present inventive concepts can obtain effects of reducing a memory bandwidth and power consumption.

Figure 7:
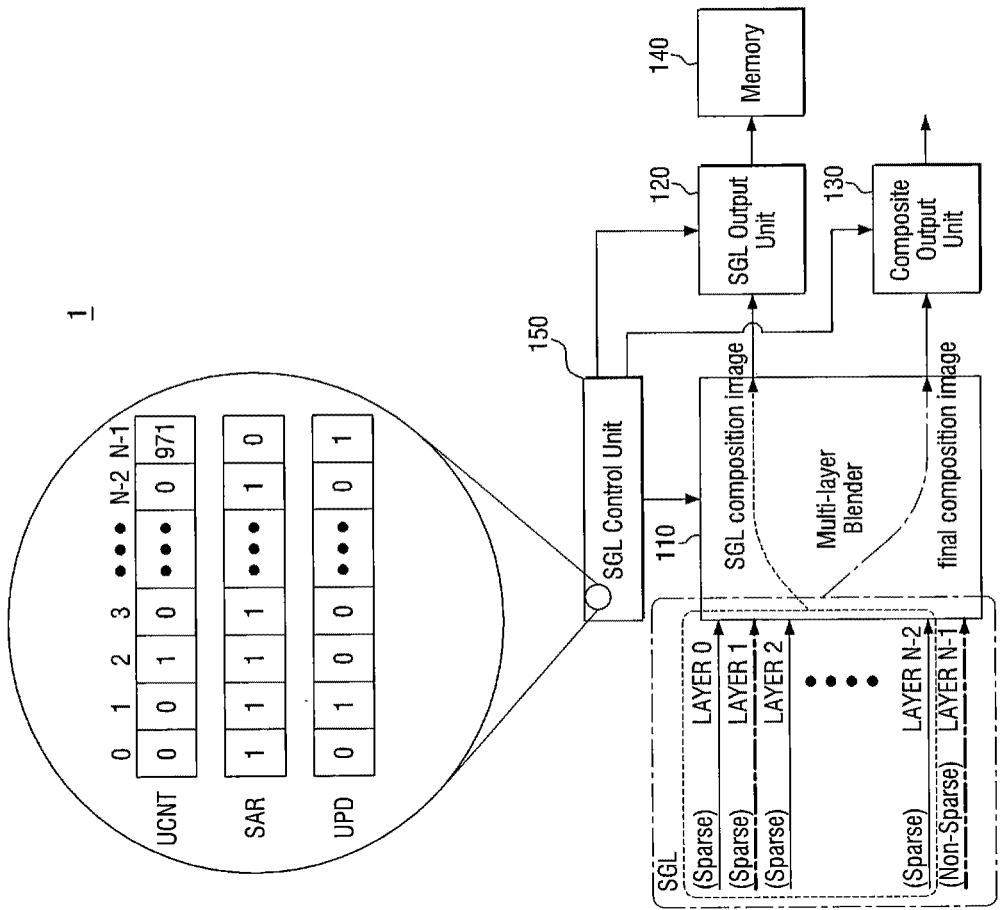
FIGS. 7 and 8 are block diagrams illustrating the registers included in an SGL control unit of the image combination device according to at least one example embodiment.
Figure 8:
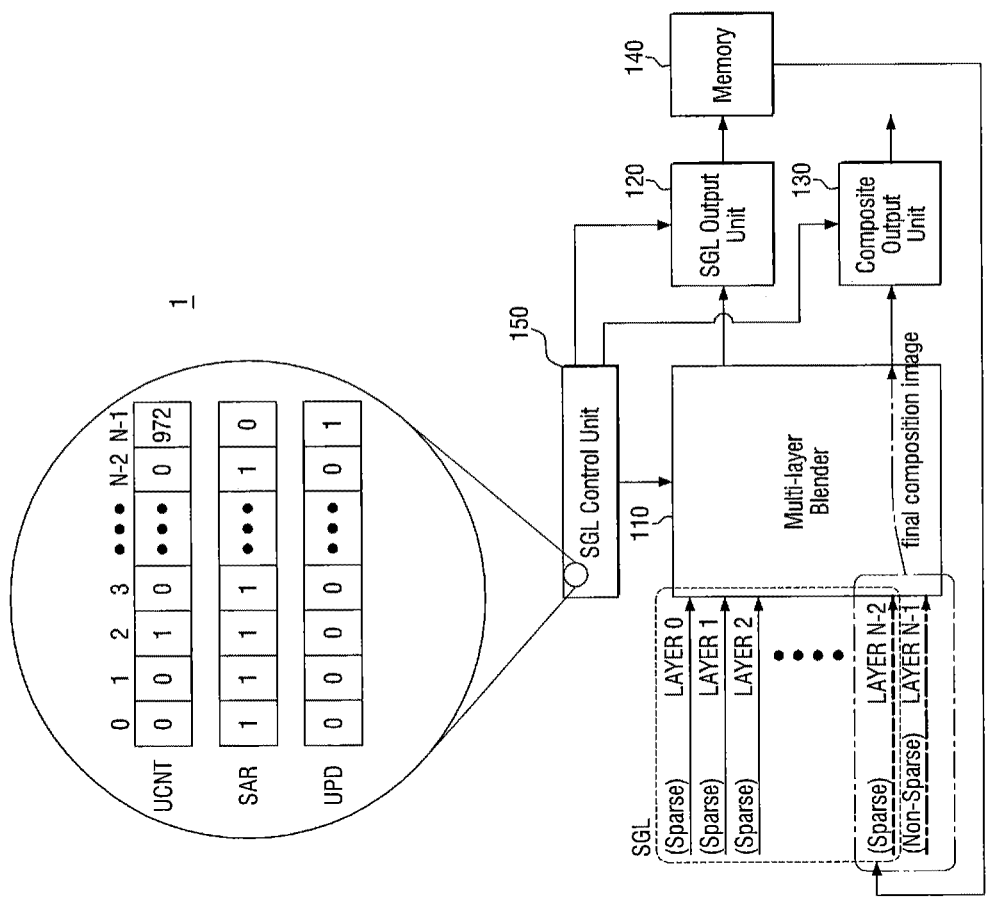

FIGS. 7 and 8 are block diagrams illustrating the registers included in the SGL control unit of the image combination device according to at least one example embodiment of the present inventive concepts. For convenience of explanation, hereinafter, the same details as those in the above-mentioned embodiment will be omitted, and differences there between will be mainly described.

The SGL control unit 150 of the image combination device 1 according to at least one example embodiment of the present inventive concepts may include a plurality of registers for setting the SGL and controlling the operation of the multi-layer blender 110.

The SGL control unit 150 has update attribute information on the input layers, and can determine the layers belonging to the SGL based on the update attribute information. The update attribute information may be defined by users, or may be defined by special purpose hardware (and/or hardware programmed by special purpose software) by checking the access frequency of individual layers. In addition, the SGL control unit 150 has update information about each layer, and can control the operations of the multi-layer blender 110 and the SGL output unit 120 by determining whether updated layers exist in the layers belonging to the SGL.

Referring to FIGS. 7 and 8, FIGS. 7 and 8 show an example of a register configuration managed in the SGL control unit 150 according to at least one example embodiment. The SGL control unit 150 may include an update counter register (UCNT), a sparse attribute register (SAR), and an update register (UPD).

The UNCT may include update frequency information about the input layers. The SGL control unit 150 can dynamically determine the first attribute (e.g., sparse) and the second attribute (e.g., non-sparse) of each of the layers using special purpose hardware (and/or hardware programmed with special purpose software) using the UNCT. However, the example embodiments of the present inventive concepts are not limited thereto, and the first attribute (e.g., sparse) and/or the second attribute (e.g., non-sparse) of each of the layers may be given by users. The UNCT may be accumulated for each frame.

The SAR is a register storing update attribute information about each of the layers input to the multi-layer blender 110. The update attribute information may include a first attribute (e.g., sparse) or a second attribute (e.g., non-sparse). That is, one layer takes the first attribute (e.g., sparse) or the second attribute (e.g., non-sparse), and information about this may be stored in the SAR. The first attribute (e.g., sparse) or the second attribute (e.g., non-sparse) may be given based on the data previously set in each of the layers, or may be given based on the UCNT storing the update frequency information about each of the layers.

The SGL control unit 150 may separate the plurality of layers into a first group of layers (for example, SGL) in which the SAR is activated (for example, having a logical value of '1') and a second group of layers not overlapping the first group of layers, based on the SAR. In this case, the first group of layers may include successive layers in the layers in which the SAR is activated.

The UPD can store update information about each of the layers input to the multi-layer blender 110. That is, the UPD indicates the update state of each of the layers to the current frame. The information of the UPD may be updated for each frame. The SGL control unit 150 can determine whether the multi-layer blender 110 reads the stored first composite image and/or whether the multi-layer blender 110 reads all of the images. Subsequently, the SGL control unit 150 can determined whether the first composite image is sent through the SGL output unit 120.

FIG. 7 and FIG. 8 correspond to FIG. 5 and FIG. 6, respectively, and show the state of registers included in each of the SGL control units 150 according to at least one example embodiment.

In FIG. 7, the UCNT represents the total number of accumulated updates from previous frames to the current frame according to an example situation. Although not shown in detail in FIG. 7, each of the fields of the UCNT represent the update frequency for an associated input layer. As depicted in FIG. 7, the fields may have values equal to or greater than 0. For example, FIG. 7 shows that every field, except for N−1 th field, have values of 0 or 1. Although exaggerated, in the UCNT, N−1 th field has been updated 971 times, 2-nd field has been updated one time, and other fields have never been updated.

The SAR represents attribute information about each of the layers. In the SAR, except for N−1 th field, the other fields have a first attribute (e.g., sparse). Therefore, in this example, the SGL includes layer 0 to layer N−2.

The UPD represents information about updated layers in the current frame (first frame). In the current frame (first frame), layer 2 and layer N−1 were updated, and thus only the corresponding field was activated.

Thus, since layer 2 included in the SGL was updated, the multi-layer blender 110 produces a first composite image based on the layers included in the SGL and transmit this first composite image to the SGL output unit 120. The SGL output unit 120 stores the transmitted first composite image in the memory 140. In addition, the SGL output unit 120 produces a second composite image of all layers and transmits the second composite image to the composite output unit 130.

FIG. 8 shows the operation after one frame of FIG. 7. The UCNT accumulated the UPD information in the first frame. Therefore, in the UCNT of the current frame (second frame), the values of 1st field and N−1 th field are respectively incremented by 1. Since the update attribute information about each layer is not changed, the value of the SAR is not changed. This fact means that, in the UPD of the current frame (second frame), only the layer N−1 was updated.

Thus, the multi-layer blender 110 does not produce the first composite image again because the layers included in the SGL are not updated. Instead, the multi-layer blender 110 reads the first composite image of the first frame stored in the memory 140. Subsequently, the multi-layer blender 110 combines the updated layer N−1 with the first composite image of the first frame to produce a second composite image. Then, the multi-layer blender 110 transmits the second composite image to the composite output unit 130, and the composite output unit 130 transmits the second composite image to an external device (not shown). This operation of the image combination device 1 is an example, and example embodiments of the present inventive concepts are capable of additional combinations of operations. In other words, the example embodiments are not limited to the example operations discussed.

Figure 9:
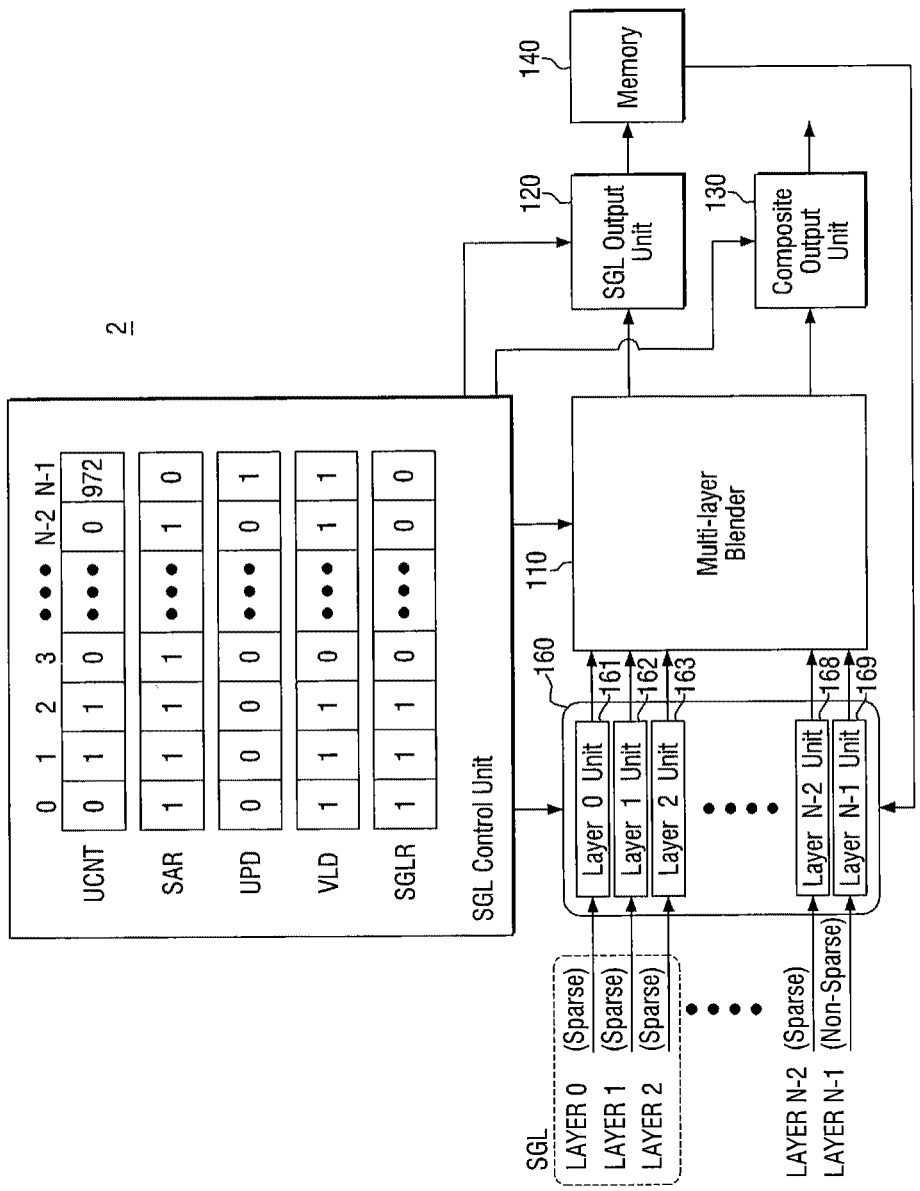
FIG. 9 is a block diagram illustrating an image combination device according to at least one example embodiment.

FIG. 9 is a block diagram illustrating an image combination device according to at least one example embodiment of the present inventive concepts. For convenience of explanation, hereinafter, the same details as those in the above-mentioned embodiment will be omitted, and differences there between will be mainly described.

Referring to FIG. 9, the image combination device 2 according to at least one example embodiment of the present inventive concepts can be operated in the substantially same manner as in the image combination device 1 described with reference to FIGS. 1 to 8. However, the image combination device 2 according to this example embodiment may further include a layer input unit 160.

The layer input unit 160 may read each layer from an external memory (not shown) or an external module (not shown), or may read the first composite image stored in the memory 140. In addition, the layer input unit 160 can transmit the plurality of read layers to the multi-layer blender 110. The layer input unit 160 can be controlled by the SGL control unit 150.

Specifically, the layer input unit 160 reads each layer from an external memory (not shown) or directly receives each layer from an external module (not shown) and then transmits the layers (serially and/or in parallel) to the multi-layer blender 110. The layer input unit 160 may include N access units 161 to 169 receiving respective layers.

The SGL control unit 150 assigns an address of each of the layer to be received by the layer input unit 160 to each of the access units 161 to 169. Each of the access units 161 to 169 accesses the memory 140 in which the first composite image is stored, external memory (not shown), or an external module (not shown) to read the data about each of the layers.

The SGL control unit 150 may further include a valid layer register (VLD) and a sparse group layer register (SGLR).

The VLD stores information about whether the plurality of layers is valid. Thus, the SGL control 150 allows the multi-layer blender 110 to perform a combination operation of only the layers in which the VLD is activated.

The SGLR stores information about whether the SGL includes a plurality of layers. The SGL control unit 150 may set the SGR of only the layers in which the VLD is activated, by the VLD. Therefore, the SGL control unit 150 may set the SGL of the layers in which both the VLD and the SGLR are activated. Accordingly, the SAR and the SGLR may be different from each other. In addition, the SGL control unit 150 may allow the multi-layer blender 110 to produce the first composite image of the layers in which both the VLD and the SGLR are activated.

In FIG. 9, since the continuous filed in which both the VLD and the SGLR are activated is composed of layer 0 to layer 2, the SGL may include layer 0 to layer 2.

In this way, the image combination device 1 according to at least one example embodiment of the present inventive concepts reduce (and/or minimize) the image input and combination operations involving invalid layers (i.e., layers in which VLD is not activated) and/or layers that are not updated (i.e., have been modified and/or further processed), thereby decreasing the required memory bandwidth and reducing the consumption of power.

Figure 10:
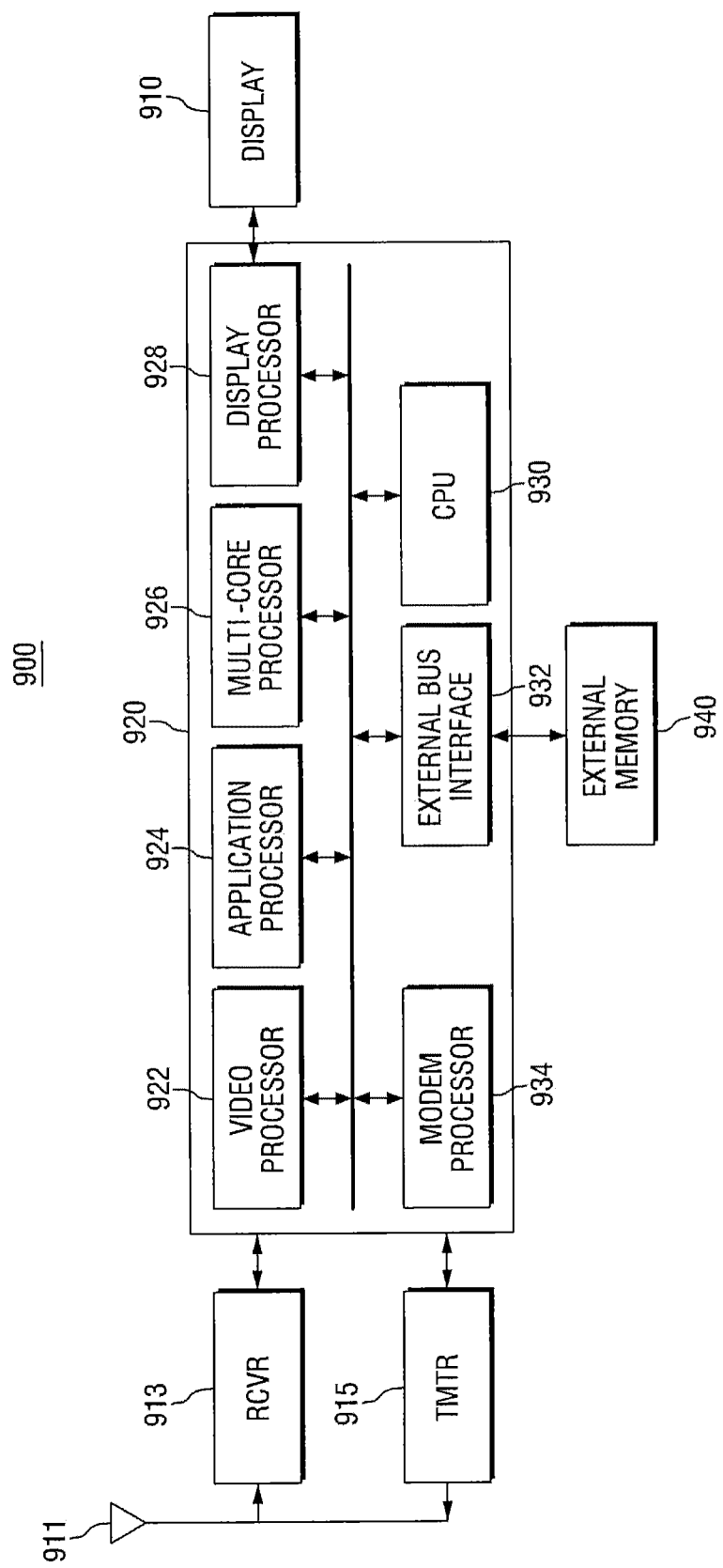
FIG. 10 is a block diagram showing a wireless communication system including the image combination device according to at least one example embodiment.

FIG. 10 is a block diagram showing a wireless communication system including the image combination device according to at least one example embodiment of the present inventive concepts.

Referring to FIG. 10, the wireless communication system 900 may be a cellular phone, a smart phone terminal, a hand set, a personal digital assistant (PDA), a laptop computer, a computer, a tablet, a smart device, a wearable device, a video game unit, or the like. The wireless communication system 900 may use Code Division Multiple Access (CDMA), Time Division Multiple Access (TDMA) such as Global System for Mobile Communications (GSM), or other wireless communication standards.

The wireless communication system 900 can provide bidirectional communication through a receiving path and a transmitting path. The signals transmitted from one or more base stations may be received by an antenna 911 in the receiving path, or may be transmitted to a receiver (RCVR) 913. The receiver 913 conditions and digitalizes the received signals, and provides samples to a digital section 920 for the purpose of additional processing. In the transmitting path, a transmitter (TMTR) 915 receives data transmitted from the digital section 920 and then processes and conditions the data to produce modulated signals. These modulated signals are transmitted to one or more base stations through the antenna 911.

The digital section 920 may be implemented as one or more digital signal processors, a microprocessor, a reduced instruction set computer (RISC), or the like. In addition, the digital section may be fabricated on one or more application specific integrated circuits (ASICs) or other types of integrated circuits.

The digital section may include various processing units and interface units, such as a modem processor 934, a video processor 922, an application processor 924, a display processor 928, a controller/multi-core processor 926, a central processing unit (CPU) 930, and an external bus interface (EBI) 932.

The video processor 922 performs processing for graphic applications. Generally, the video processor 922 may include any number of processing units and/or modules for any set of graphic operations. The specific portion (and/or operations) of the video processor 922 may be implemented by firmware and/or software. For example, the control unit may be implemented by firmware and/or software modules (for examples, procedures, functions, etc.) for performing the above-mentioned functions. Firmware and/or software codes may be stored in memory, and may also be executed by a processor (for example, multi-core processor 926). Memory may be implemented in the processor, or may be implemented outside the processor.

The video processor 922 may implement a software interface such as open graphic library (OpenGL), Direct 3D, DirectX, or the like. The central processing unit (CPU) 930 may execute a series of graphic processing operations together with the video processor 922. The controller/multi-core processor 926 includes at least two cores, and thus can simultaneously process workloads by assigning the workloads to the two cores depending on the workloads which must be processed by the controller/multi-core processor 926. However, the present inventive concepts are not limited thereto, and example embodiments may be implemented using one or more processors and/or processor cores.

In FIG. 10 the application processor 924 is shown as one component included in the digital section 920, but the example embodiments of the present inventive concepts are not limited thereto. In some example embodiments of the present inventive concepts, the digital section 920 may be integrated and realized into one application process 924 or an application chip.

The modem processor 934 may perform the operations required in the data transmission process among the receiver 913, the transmitter 915 and the digital section 920. The display processor 928 may perform the operations required in driving a display 910.

The display system according to at least one example embodiment of the present inventive concepts may perform one or more image combination operations using the shown processors 922, 924, 926, 928, 930 and 934 and memory. This display system may include the above-described image combination devices 1 and 2 according to some example embodiments of the present inventive concepts.

For example, the display system may perform an image combination operation using the video processor 922. In this case, the video processor 922 combines some of a plurality of layers to produce a first composite image, and combine the first composite image with other layers of the plurality of layers to produce a second composite image. In addition, the video processor 922 may store the first composite image in internal memory or external memory.

Moreover, the video processor 922 may include the multi-layer blender 110, the SGL control unit 150, the SGL output unit 120 and the composite output unit 130 according to some example embodiments of the present inventive concepts, and may be operated in substantially the same manner as the above-described image combination device. However, the example embodiments of the present inventive concepts are not limited thereto.

Next, a computing system including the image combination device according to at least one example embodiment of the present inventive concepts will be described with reference to FIG. 11.

Figure 11:
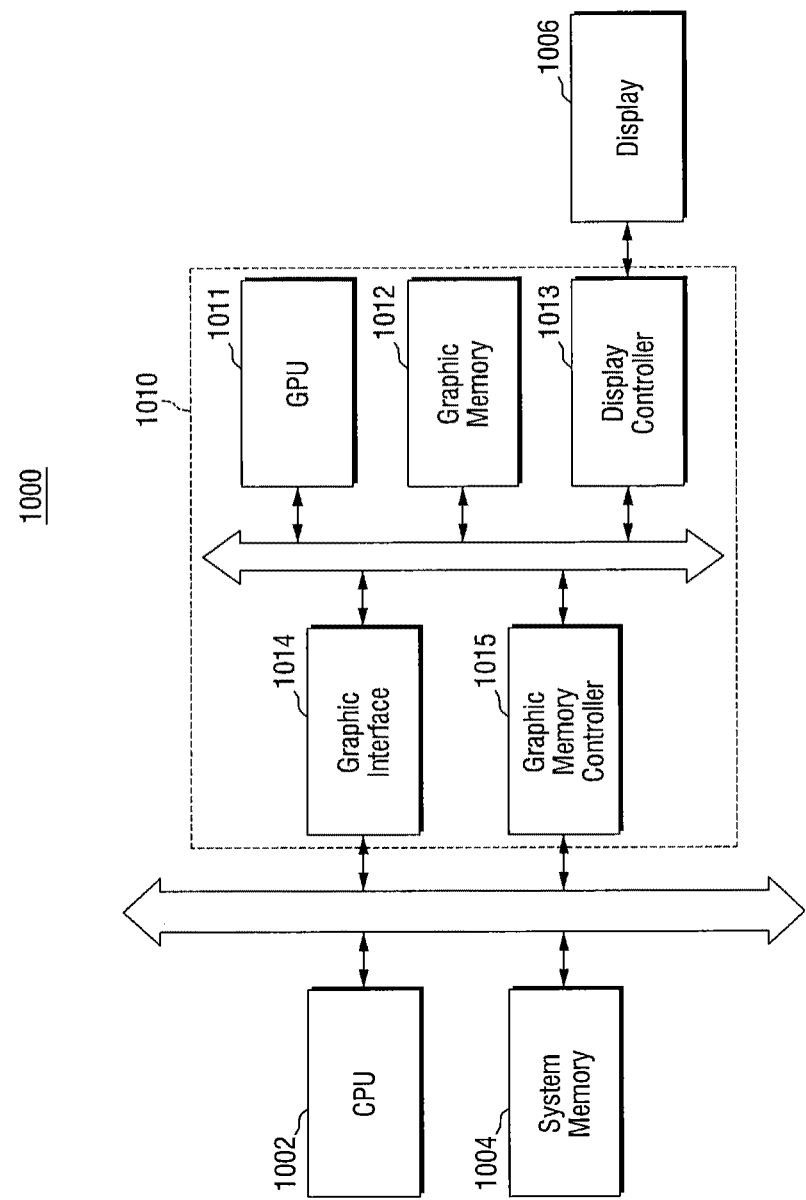
FIG. 11 is a block diagram showing a computing system including the image combination device according to at least one example embodiment.

FIG. 11 is a block diagram showing a computing system including the image combination device according to at least one example embodiment of the present inventive concepts.

Referring to FIG. 11, the computing system 1000 includes a central processing unit (CPU) 1002, a system memory 1004, a graphic system 1010, and a display device 1006.

The central processing unit (CPU) 1002 may perform an operation required in driving the computing system 1000. The system memory 1004 may be configured to store data. The system memory can store the data processed by the CPU 1002. The system memory 1004 may serve as an operational memory of the CPU 1002. The system memory 1004 may include at least one volatile memory, such as double data rate static DRAM (DDR SDRAM) or single data rate static DRAM (SDR SDRAM), and/or at least one non-volatile memory, such as electrical erasable programmable ROM (EEPROM) or flash memory.

The graphic system 1010 may include a graphic process unit (GPU) 1011, a graphic memory 1012, a display controller 1013, a graphic interface 1014, and a graphic memory controller. Any one of the above-described image combination devices 1 and 2 according to some example embodiments of the present inventive concepts may be employed as a component of this graphic system 1010.

The GPU 1011 may perform a graphic operation processing required for the computing system 1000. Specifically, the GPU 1011 can assemble primitives each consisting of one or more vertices and perform rendering using the assembled primitives.

The graphic memory 1012 may store the graphic data processed by the GPU 1011, or may store the graphic data provided to the GPU 1011. In addition, the graphic memory 1012 may serve as an operational memory of the GPU 1011. Any one of the above-described image combination devices 1 to 2 according to some example embodiments of the present inventive concepts may be employed as a component of this graphic memory 1012.

The display controller 1013 controls the display device 1006 such that the rendered image frame can be displayed.

The graphic interface 1014 may interface the central processing unit 1002 and the GPU 1011, and the graphic memory controller 1015 may provide memory access between the system memory 1004 and the GPU 1011.

Although not clearly shown in FIG. 11, the computing system 1000 may further include at least one input device, such as a button, a touch screen or a microphone, and/or at least one output device, such as a speaker. In addition, the computing system 1000 may further include an interface device for exchanging data with an external device by wire or wireless communication. The interface device may be an antenna, a wire and wireless transceiver, or the like.

According to at least one example embodiment, the computing system 1000 may be any computing system, such as a mobile phone, a smart phone, a personal digital assistant (PDA), a desktop, a laptop, a notebook, a tablet, a smart device, a wearable device, a portable gaming console, etc.

Next, an electronic system including the image combination device according to at least one example embodiment of the present inventive concepts will be described with reference to FIG. 12.

Figure 12:
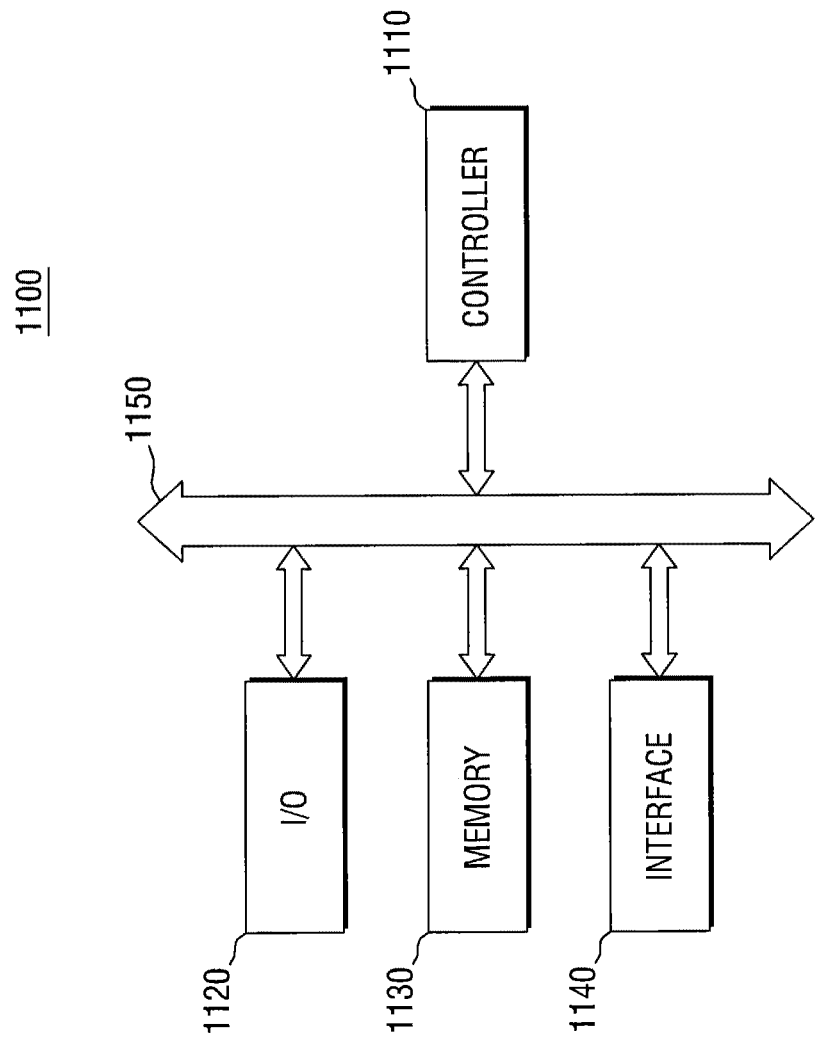
FIG. 12 is a block diagram showing an electronic system including the image combination device according to at least one example embodiment.

FIG. 12 is a block diagram showing an electronic system including the image combination device according to at least one example embodiment of the present inventive concepts.

Referring to FIG. 12, the electronic system 1100 may include a controller 1110, an input/output (10) unit 1120, a memory unit 1130, an interface 1140, and a bus 1150. The controller 1110, the input/output (I/O) unit 1120, the memory unit 1130, and/or the interface 1140 are connected to each other through the bus 1150. The bus 1150 refers to a path through which data is transferred.

The controller 1110 may include at least one of a microprocessor, a digital signal processor, a microcontroller, and a logic device having a similar function thereto. The input/output (I/O) unit 1120 may include a keypad, a keyboard, a display, and the like. The memory unit 1130 may store data and/or commands. The interface 1140 may perform a function of transmitting data to a communication network and receiving the data from the communication network. The interface 1140 may be a wired or wireless interface. For example, the interface 1140 may include an antenna or a wired and wireless transceiver.

Although not shown in FIG. 12, the electronic system 1100 may further include high-speed DRAM and/or SRAM as an operation memory for improving the operation of the controller 1110. Any one of the above-described image combination devices 1 and 2 according to some example embodiments of the present inventive concepts may be provided in the memory unit 1130, or may be provided as part of the controller 1110, the input/output (I/O) unit 1120, or the like.

The electronic system 1100 can be applied to personal digital assistants (PDAs), portable computers, web tablets, wireless phones, mobile phones, digital music players, memory card, smart devices, wearable devices, portable gaming consoles, and/or other electronic products transmitting and/or receiving information in a wireless environment.

Figure 13:
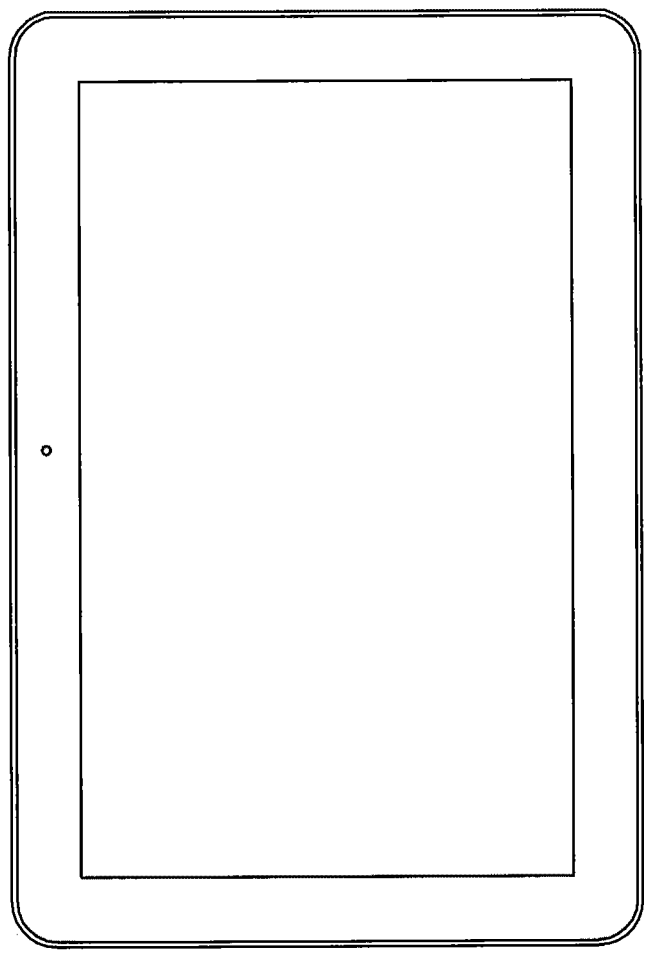
FIGS. 13 to 15 are perspective views showing examples of display systems that can apply the image combination device according to at least one example embodiment.
Figure 14:
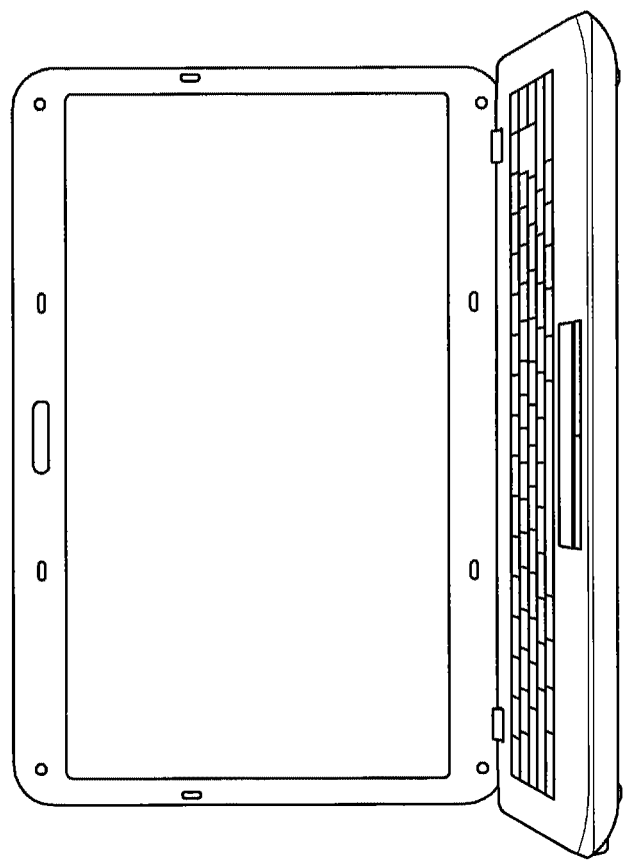
Figure 15:
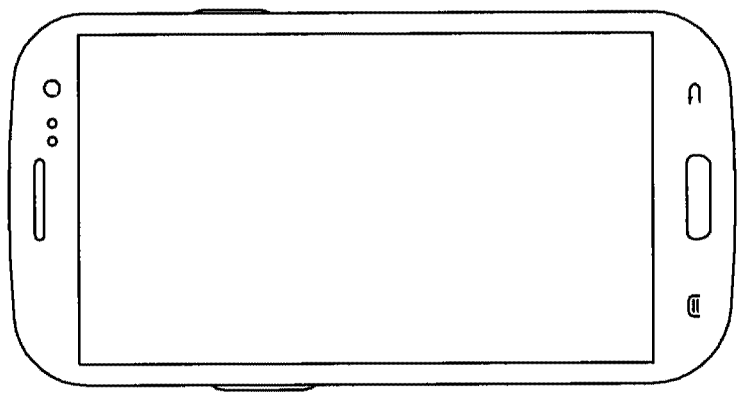

FIGS. 13 to 15 are perspective views showing example display systems that can apply the image combination devices according to some example embodiments of the present inventive concepts.

FIG. 13 shows a tablet PC 1200, FIG. 14 shows a notebook computer 1300, and FIG. 15 shows a smart phone 1400. At least one of the image combination devices 1 and 2 according to some example embodiments of the present inventive concepts can be used in computing and/or processing devices, such as the tablet PC 1200, the notebook computer 1300, and/or the smart phone 1400, etc.

Meanwhile, it will be obvious to those skilled in the art that the image combination devices according to some example embodiments of the present inventive concepts can be applied to other non-exemplified integrated circuit systems. That is, the tablet PC 1200, the notebook computer 1300, and the smart phone 1400 have been described as examples of the display systems according to at least one example embodiment, but examples of the display systems according to the example embodiments of the present inventive concepts are not limited thereto. The display systems according to some example embodiments of the present inventive concepts can be realized in computers, ultra mobile PCs (UMPCs), work stations, net-books, personal digital assistants (PDAs), portable computers, wireless phones, mobile phones, e-book readers, portable multimedia players (PMPs), portable game machines, personal navigation devices, black boxes, digital cameras, televisions, 3-dimensional televisions, video projectors, digital audio recorders, digital audio players, digital picture recorders, digital picture players, digital video recorders, digital video players, tablets, smart devices, wearable devices, and the like.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A display system, comprising:
a processor configured to combine some layers of a plurality of layers to produce a first composite image and combine other layers of the plurality of layers to produce a second composite image; and
a memory storing the first composite image,
the processor includes,
a multi-layer blender configured to receive the plurality of layers and output the first and second composite images,
a sparse group layer (SGL) output unit configured to transmit the first composite image to the memory,
a composite output unit configured to transmit the second composite image, and
a SGL control unit configured to control the multi-layer blender, the SGL output unit and the composite output unit,
wherein the processor is configured to produce the first composite image when any one of layers included in a first group layer is set by the SGL control unit in a first frame and is stored in the memory, and
the processor is configured to produce the second composite image by using the first composite image stored in the memory when all of layers included in the first group layer are not updated in a second frame after the first frame.

2. The display system of claim 1, further comprising:
a layer input unit configured to,
transmit the plurality of layers to the multi-layer blender and controlled by the SGL control unit, and
read each of the layers from external memory or an external module, or read the first composite image stored in the memory.

3. The display system of claim 1, wherein the SGL control unit further comprises:
an update counter register (UCNT) configured to store update frequency information about the plurality of layers;

a sparse attribute register (SAR) configured to store update attribute information about the plurality of layers; and an update register (UPD) configured to store update information about the plurality of layers.

4. The display system of claim 3, wherein the first group layer includes successive layers in the layers in which the SAR is activated.

5. The display system of claim 3,
wherein the update attribute information includes a first attribute or a second attribute, and
wherein the first attribute or the second attribute is given based on data previously determined in each of the layers, or is given based on the UCNT storing update frequency information about each of the layers.

6. The display system of claim 3, wherein the SGL control unit further comprises:
a valid layer register (VLD) configured to store information about whether each of the layers input to the multi-layer blender is valid; and
a sparse group layer register (SGLR) configured to store information about whether each of the layers input to the multi-layer blender is included in the sparse group layer (SGL).

7. The display system of claim 6,
wherein the multi-layer blender is configured to perform a combination operation using the layer in which the VLD is activated, and
wherein the multi-layer blender is configured to produce the first composite image of the layer in which the VLD and the SGLR are activated.

8. The display system of claim 1,
wherein the multi-layer blender is configured to produce the first composite image when the layers included in the first group layer are updated, and
wherein the multi-layer blender is configured to not produce the first composite image when the layers included in the first group layer are not updated.

9. The display system of claim 1, wherein the multi-layer blender is configured to produce the second composite image for each frame.

10. An image combination device, comprising:
a sparse group layer (SGL) control unit configured to separate a plurality of layers into a first layer group and a second layer group, the layers of the second layer group not including the layers of the first layer group;
a multi-layer blender configured to combine the first layer group to produce a first composite image in a first frame and combine the second layer group including updated layers with the first composite image of the first frame to produce a second composite image in a second frame subsequent to the first frame;
a memory configured to store the first composite image;
a SGL output unit configured to receive the first composite image and transmit the received first composite image to the memory; and
a composite output unit configured to receive the second composite image and transmit the received second composite image to an external device, wherein
the first composite image is produced by combining at least two of the plurality of layers input to the multi-layer blender, and
the second composite image is produced by combining all the plurality of layers input to the multi-layer blender.

11. The image combination device of claim 10, further comprising:
a layer input unit configured to transmit the plurality of layers to the multi-layer blender and controlled by the SGL control unit,
wherein the layer input unit is configured to
read each of the layers from an external memory or receive each of the layers from an external module, and
transmit the read or received layers to the multi-layer blender.

12. The image combination device of claim 11, wherein the layer input unit is configured to,
receive the first composite image, or receive each of the layers included in the SGL, and
transmit the received first composite image or layers included in the SGL to the multi-layer blender.

13. The image combination device of claim 11, wherein
the layer input unit includes N access units configured to receive at least one of the plurality of layers,
the SGL control unit is configured to assign addresses of each of the layers to be received by the layer receiving unit to each of the access units, and
each of the N access units is configured to receive the at least one of the plurality of layers from the memory, the external memory, or the external module.

14. The image combination device of claim 10, wherein the SGL control unit includes,
a valid layer register (VLD) configured to store information about whether each of the layers input to the multi-layer blender is valid, and
a sparse group layer register (SGLR) configured to store information about whether each of the layers input to the multi-layer blender is included in the first group layer.

15. The image combination device of claim 14, wherein the multi-layer blender is configured to perform a combination operation of the layers in which the VLD is activated.

16. An image combination device, comprising:
a layer receiving unit configured to receive a plurality of layers corresponding to a current frame;
a sparse group layer (SGL) control unit configured to separate the plurality of layers into a first layer group and a second layer group, the layers in the second layer group not overlapping the layers in the first layer group, the SGL control unit including a sparse attribute register (SAR) configured to store update attribute information about the plurality of layers that are activated;
a memory configured to store a first composite image of a frame prior to the current frame;
a multi-layer blender configured to combine the first composite image transmitted from the memory with the second layer group to produce a second composite image;
an SGL output unit configured to receive the first composite image and transmit the received first composite image to the memory; and
a composite output unit configured to receive the second composite image and transmit the second composite image to an external device.

17. The image combination device of claim 16, further comprising:
a layer input unit configured to transmit the plurality of layers to the multi-layer blender and the layer input unit is controlled by the SGL control unit, wherein the layer input unit is configured to,
  read each of the layers from an external memory or an external module,
or
  read the first composite image stored in the memory.

18. The image combination device of claim 16, wherein the SGL control unit further comprising:
  an update counter register (UCNT) configured to store update frequency information about the plurality of layers; and
  an update register (UPD) configured to store update information about the plurality of layers.

19. The image combination device of claim 16, wherein the SGL control unit further comprising:
  a valid layer register (VLD) configured to store information about whether the plurality of layers are valid; and
  a sparse group layer register (SGLR) configured to store information about whether the plurality of layers are included in the sparse group layer (SGL).

20. The image combination device of claim 19, wherein the multi-layer blender is configured to perform a combination operation of the layers in which the VLD is activated, and
the multi-layer blender is configured to produce the first composite image of the layers in which both of the VLD and the SGLR are activated.

* * * * *